(12) United States Patent
Mellor

(10) Patent No.: US 11,820,489 B2
(45) Date of Patent: Nov. 21, 2023

(54) BALL SCREW ROTARY ACTUATOR WITH BALL CAGE

(71) Applicant: The Boeing Company, Chicago, IL (US)

(72) Inventor: Mitchell Loren Ray Mellor, Bothell, WA (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 17/491,720

(22) Filed: Oct. 1, 2021

(65) Prior Publication Data

US 2023/0108051 A1    Apr. 6, 2023

(51) Int. Cl.
| | |
|---|---|
| *B64C 13/34* | (2006.01) |
| *F15B 15/02* | (2006.01) |
| *F16H 47/02* | (2006.01) |

(52) U.S. Cl.
CPC ............ *B64C 13/34* (2013.01); *F15B 15/02* (2013.01); *F16H 47/02* (2013.01); *F15B 2211/7058* (2013.01)

(58) Field of Classification Search
CPC .......... B64C 13/14; F15B 15/02; F15B 15/06; F15B 15/065; F15B 15/068; F15B 2211/7058; F16H 47/02
See application file for complete search history.

(56) References Cited

U.S. PATENT DOCUMENTS

| | | | | |
|---|---|---|---|---|
| 4,738,415 | A | * 4/1988 | Weyer | ...................... B64C 13/36 |
| | | | | 92/76 |
| 4,945,779 | A | * 8/1990 | Williams | .............. F15B 15/068 |
| | | | | 92/33 |
| 5,144,851 | A | 9/1992 | Grimm et al. | |
| 10,100,850 | B1 | * 10/2018 | Raymond | ............. F15B 15/068 |
| 2015/0267722 | A1 | 9/2015 | Jang | |
| 2017/0335932 | A1* | 11/2017 | Nguyen | .................. B64C 13/28 |

FOREIGN PATENT DOCUMENTS

| | | |
|---|---|---|
| EP | 3023671 A1 | 5/2016 |
| JP | H04231705 A | 8/1992 |

OTHER PUBLICATIONS

European Search Report; Application EP22193137; dated Jan. 17, 2023.

* cited by examiner

*Primary Examiner* — Michael H Wang
(74) *Attorney, Agent, or Firm* — Duft & Bornsen, PC

(57) ABSTRACT

Ball screw rotary actuator with ball cage. In one embodiment, a ball screw rotary actuator includes an outer cylinder, a piston, and inner shaft. Outer ball bearings travel in helical groove between the outer cylinder and position to rotate the piston as it translates due to fluid pressure. The inner shaft is situated radially inward of the piston, and straight grooves are disposed between the piston and the inner shaft. Inner ball bearings travel in the straight grooves and rotate the inner shaft as the piston rotates. The ball screw rotary actuator also includes an outer ball cage to position the outer ball bearings in a spaced configuration, an outer indexing gear to control a position of the outer ball cage, an inner ball cage to position the inner ball bearings in a spaced configuration, and an inner indexing gear to control a position of the inner ball cage.

20 Claims, 9 Drawing Sheets

BALL SCREW ROTARY ACTUATOR WITH BALL CAGE

FIELD

This disclosure relates to the field of actuators, and in particular, to rotary actuators.

BACKGROUND

A rotary actuator is a mechanical device that creates rotary motion. A lead screw rotary actuator is one type of actuator that is commonly used in heavy machinery. A lead screw rotary actuator is a mechanical device that turns linear motion into rotary motion. Although considered reliable and robust for industrial uses, screw rotary actuators are heavy, have high friction, and cannot be back-driven, making them unsuitable for aerospace applications.

A ball screw is typically implemented as a type of linear actuator that translates rotational motion to linear force with little friction. Ball screws achieve lower friction than lead screws because the rolling motion of the ball bearings along their path creates less friction than sliding motion between the male and female portions of the lead screw. A typical design of a ball screw actuator uses a low screw pitch (e.g., 4 to 20 threads per inch) so that the rod can be rotated at relatively low input torque to create relatively high linear force. However, while a ball screw is a commonly encountered type of linear actuator, it typically cannot be used as a rotary actuator which uses linear force to create rotary motion.

SUMMARY

Embodiments herein describe a ball screw rotary actuator with a ball cage. One or more ball cages disposed within the ball screw rotatory actuator confines ball bearings in a spaced grid for reduced friction. Additionally, the movement of the ball cage itself is confined according to an indexing gear. This prevents the ball cage and ball bearings from undesirably sliding out of position (e.g., due to vibrations or gravity), thus improving efficiency, robustness, and longevity of the ball screw actuator. Additionally, the controlled position of the ball cage and ball bearings within the actuator eliminates external ball return tracks to simplify the design and reduce the overall size of the actuator. Still further, the combination of components reduces internal friction and can be used in conjunction with a high screw pitch or lead to prevent the actuator from seizing in the event of failure. The rotary actuator is thus suitable for numerous applications in which size, weight, efficiency, and back-drive capability are of concern. As an example, the ball screw rotary actuator may be used to drive ailerons, flaps, and spoilers on thin wing airplane designs, and may be mounted directly on the hinge line or adjacent to it and not stick out from the wing contour.

One embodiment is a ball screw rotary actuator that includes an outer cylinder including a number of fluid ports, a piston configured to translate within the outer cylinder due to fluid pressure, helical grooves disposed between the outer cylinder and the piston, and outer ball bearings configured to travel in the helical grooves to rotate the piston within the outer cylinder as the piston translates. The ball screw rotary actuator further includes an inner shaft situated radially inward of the piston, straight grooves disposed between the piston and the inner shaft, and inner ball bearings configured to travel in the straight grooves, and to rotate the inner shaft as the piston rotates. The ball screw rotary actuator also includes an outer ball cage configured to position the outer ball bearings in a spaced configuration, an outer indexing gear configured to control a position of the outer ball cage, an inner ball cage configured to position the inner ball bearings in a spaced configuration, and an inner indexing gear configured to control a position of the inner ball cage.

Another embodiment is a method of assembling a ball screw rotary actuator. The method includes providing a piston to translate within an outer cylinder due to fluid pressure, forming helical grooves between the piston and the outer cylinder, providing one or more outer indexing gears situated in one or more of the helical grooves, and mechanically coupling an outer ball cage with the one or more outer indexing gears, the outer ball cage being disposed between the piston and the outer cylinder and configured to position outer ball bearings in a spaced configuration in the helical grooves. The method also includes providing an inner shaft radially inward of the piston, forming straight grooves between the inner shaft and the piston, providing one or more inner indexing gears situated in one or more of the straight grooves, and mechanically coupling an inner ball cage with the one or more inner indexing gears, the inner ball cage being disposed between the piston and the inner shaft and configured to position inner ball bearings in a spaced configuration in the straight grooves.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
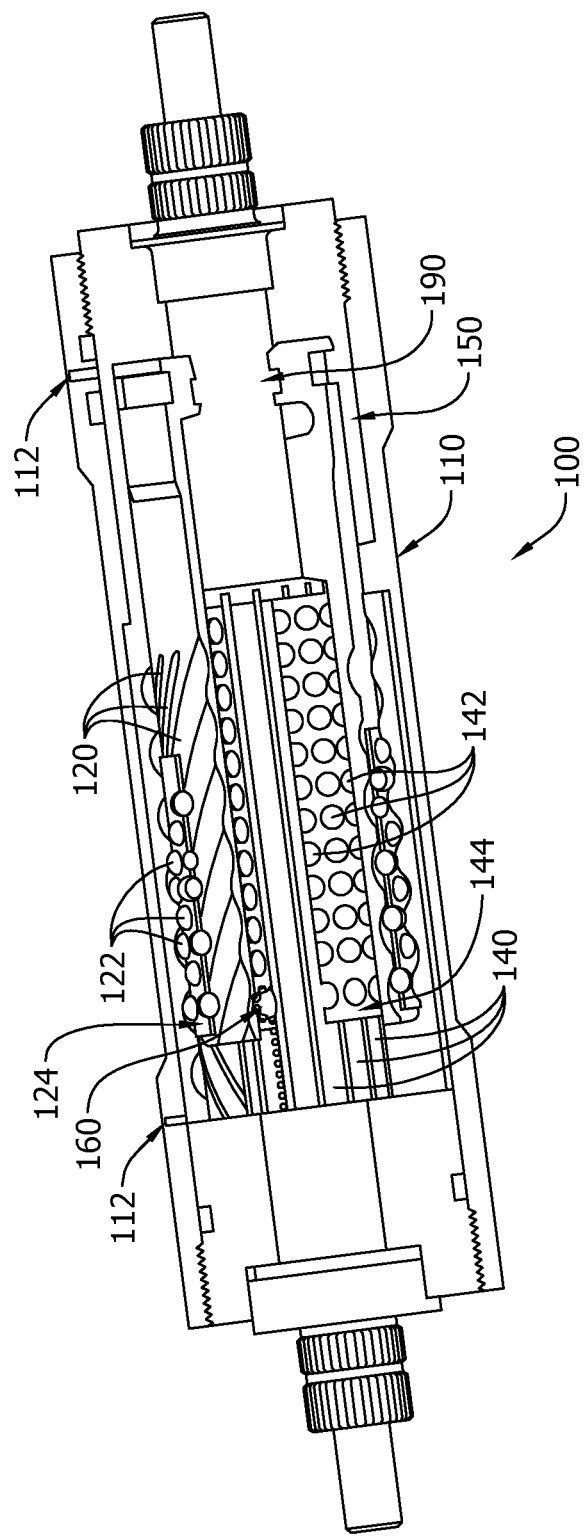
FIG. 1 is a cutaway perspective view of a ball screw rotary actuator in an illustrative embodiment.

FIG. 1 is a cutaway perspective view of a ball screw rotary actuator 100 in an illustrative embodiment. The ball screw rotary actuator 100 includes an outer cylinder 110, a piston 150, and an inner shaft 190. The outer cylinder 110 includes one or more fluid ports 112 to admit a hydraulic fluid from a hydraulic fluid source. Differential fluid pressure drives the piston 150 left or right. For example, FIG. 1 shows leftward arrows indicating a linear force acting upon the piston 150. The piston 150 is thus configured to translate within the outer cylinder 110 due to fluid pressure. The inner shaft 190 is situated radially inward from the piston 150, and one or both ends of the inner shaft 190 may protrude from the outer cylinder 110. The outer cylinder 110, piston 150, and inner shaft 190 may thus be coaxially arranged about a common longitudinal axis.

The ball screw rotary actuator 100 also includes helical grooves 120 disposed between the outer cylinder 110 and the piston 150. Outer ball bearings 122 travel in the helical grooves 120 to rotate the piston 150 within the outer cylinder 110 as the piston 150 translates. Advantageously, the outer ball bearings 122 are held in an outer ball cage 124 that spaces the outer ball bearings 122 from each other, reducing friction as the outer ball bearings 122 roll in the helical grooves 120. Moreover, by spacing and positioning the outer ball bearings 122, the outer ball bearings 122 need not recirculate in the helical grooves 120, thus eliminating external ball return tracks to simplify and reduce the overall size of the ball screw rotary actuator 100.

The ball screw rotary actuator 100 further includes straight grooves 140 disposed between the piston 150 and the inner shaft 190. Inner ball bearings 142 travel in the straight grooves 140 and rotate the inner shaft 190 (as shown by rotation arrow in FIG. 1) as the piston 150 rotates. In other words, the inner ball bearings 142 minimize friction in the axial or longitudinal direction, and key the piston 150 to the inner shaft 190 so that the piston 150 and inner shaft 190 rotate together. Accordingly, the ball screw rotary actuator 100 translates linear force into rotary motion.

Advantageously, the inner ball bearings 142 are held in an inner ball cage 144 that spaces the inner ball bearings 142 from each other, reducing friction as the inner ball bearings 142 roll in the straight grooves 140. Similar to that described above for the outer ball cage 124, the inner ball cage 144 positions the inner ball bearings 142 such that the inner ball bearings 142 need not recirculate in the straight grooves 140, thus eliminating corresponding ball return tracks to simplify and reduce the overall size of the ball screw rotary actuator 100. Moreover, the ball cages 124/144 eliminate the need to pack the ball bearings 122/124 in their respective grooves, thus further simplifying the ball screw rotary actuator 100.

Additionally, the ball screw rotary actuator 100 is enhanced with one or more indexing gears 160 configured to position the ball cages 124/144. For ease of illustration, FIG. 1 shows an indexing gear 160 controlling the position of the inner ball cage 144, though it will be appreciated that another indexing gear may similarly position the outer ball cage 124. By controlling the position of the ball cages 124/144 within the ball screw rotary actuator 100, which in turn control the position of the ball bearings 122/124 in a spaced configuration, the indexing gears 160 advantageously prevent "creep," the phenomenon where ball bearings tend to slide instead of roll, causing friction and wear. Compared with traditional acme screw rotary actuators that provide approximately forty to sixty percent efficiency, the ball screw rotary actuator 100, through the use of ball bearings 122/142 that roll with minimal friction, provides greater than ninety-five percent efficiency. The ball screw rotary actuator 100 is also lightweight and configured to be back-driven, making it suitable for various aerospace applications such as flight control surfaces where redundant actuators may be required for reliability.

Figure 2:
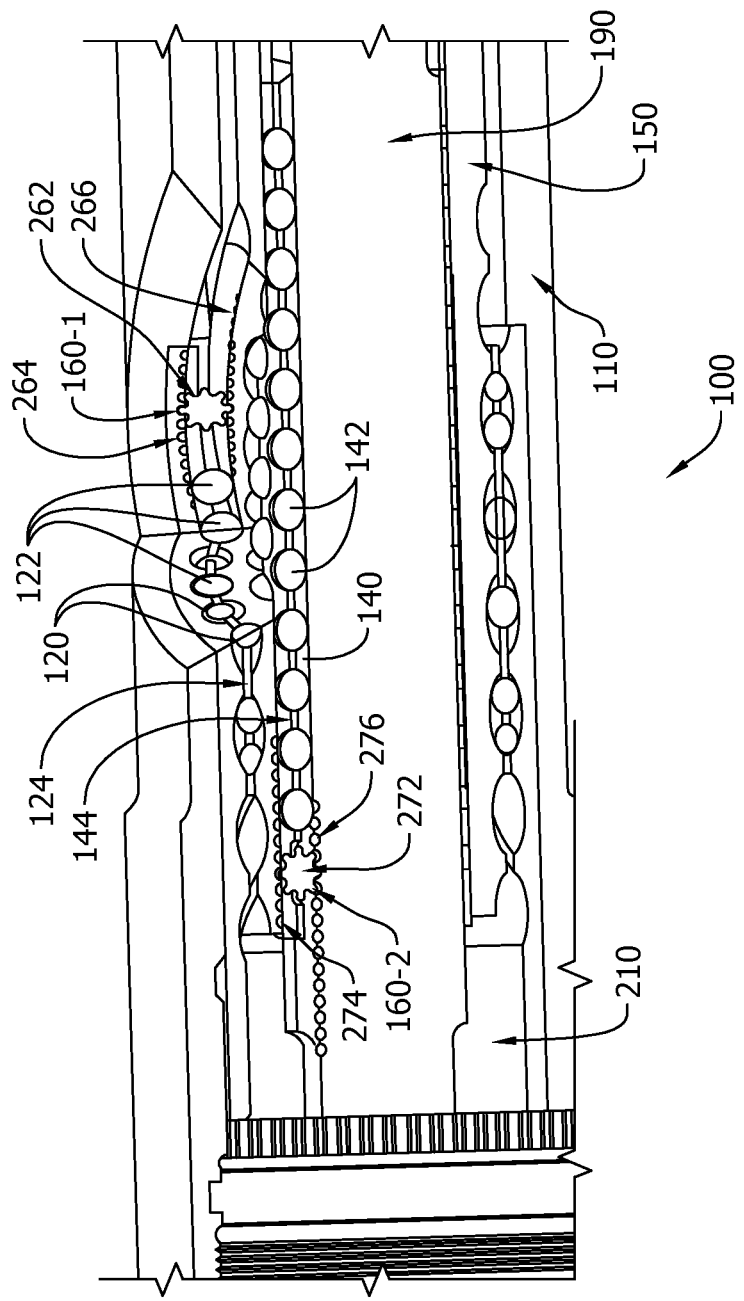
FIG. 2 is a partial cross-sectional side view of the ball screw rotary actuator in an illustrative embodiment.

FIG. 2 is a closeup, cutaway cross-sectional side view of the ball screw rotary actuator 100 in an illustrative embodiment. FIG. 2 shows that the inner walls of the outer cylinder 110 may be formed by a helical sleeve 210. Accordingly, the outer ball bearings 122 may be disposed between the piston 150 and the helical sleeve 210. In other words, the outer diameter of the piston faces an inner diameter or wall of the helical sleeve 210 to form the helical grooves 120. In one embodiment, the outer diameter of the piston 150 includes the male portion of a ball screw (i.e., male portion or threads of the helical grooves 120), and the inner walls of the helical sleeve 210 (or outer cylinder 110) includes the female portion of the ball screw (i.e., female portion or threads of the helical grooves 120). The helical sleeve 210 may be disposed inside the pressure vessel formed by the outer cylinder 110 such that it does not react pressure loads, and the helical ball screw track may thus advantageously avoid deflection due to pressure.

Additionally, FIG. 2 shows indexing gears 160 configured to control the position of respective ball cages 124/144 and ball bearings 122/142. In particular, an outer indexing gear 160-1 is disposed between the helical sleeve 210 and the piston 150. The outer indexing gear 160-1 is configured to control the position of the outer ball cage 124. The outer indexing gear 160-1 includes an outer rotating gear 262 (or pinion gear) configured to engage one or more outer track gears 264-266 (or rack gear) as it rotates.

In this example, the first outer track gear 264 and second outer track gear 266 act as tracks, and outer rotating gear 262 acts as a pinion gear. A first outer track gear 264 is disposed on an inner wall surface of the helical sleeve 210, and a second outer track gear 266 is disposed on an outer diameter of the piston 150. The outer track gears 264-266 include a series of indentations disposed along a helical groove 120 configured to receive/engage with teeth of the outer rotating gear 262. Since the outer rotating gear 262 is situated within a spacing of the outer ball cage 124, the engagement between the outer rotating gear 262 and the outer track gears 264-266 controls the motion of the outer ball cage 124 and outer ball bearings 122 to eliminate sliding and reduce friction.

Similarly, the inner indexing gear 160-2 is disposed between the piston 150 and the inner shaft 190. The inner indexing gear 160-2 is configured to control a position of the inner ball cage 144. The inner indexing gear 160-2 includes an inner rotating gear 272 configured to engage one or more inner track gears 274-276 as it rotates. In this example, a first inner track gear 274 is disposed on an inner diameter of the piston 150, and a second inner track gear 276 is disposed on an outer diameter of the inner shaft 190. The inner track gears 274-276 include a series of indentations disposed along a straight groove 140 configured to receive/engage with teeth of the inner rotating gear 272. Since the inner rotating gear 272 is situated within a spacing of the inner ball cage 144, the engagement between the inner rotating gear 272 and the inner track gears 274-276 controls the motion of the inner ball cage 144 and inner ball bearings 142 to eliminate sliding and reduce friction.

The helical grooves 120 may be sized with a diameter slightly smaller than that of the outer ball bearings 122 such that the outer ball bearings 122 contact the inner walls to actively carry load with little lost motion or free play. In another embodiment, the helical grooves 120 may be sized with a diameter slightly larger than that of the outer ball bearings 122 such that the outer ball bearings 122 contact the inner walls and actively carry load after a small amount of rotational motion. The outer ball bearings 122 thus force the piston 150 to rotate with respect to the outer cylinder 110 due to the twisting path shape and fit of the outer ball bearings 122 in the helical grooves 120. The straight grooves 140 may similarly be sized with a diameter slightly smaller or slightly larger than that of the inner ball bearings 142 such that the inner ball bearings 142 contact the inner walls to carry load to rotate the inner shaft 190.

In some embodiments, the ball screw rotary actuator 100 includes multiple outer indexing gears 160-1 and/or multiple inner indexing gears 160-2. For example, the ball screw rotary actuator 100 may include three indexing gears 160 spaced evenly around respective circumferences. In one embodiment, the ball screw rotary actuator 100 uses a large screw pitch (e.g., ten or more inches of stroke per rotation) so that the ball screw rotary actuator 100 can be back-driven by applying torque to the inner shaft 190. This prevents the ball screw rotary actuator 100 from seizing in the event of a power failure. Additionally, a relatively high output torque may be achieved with a relatively low linear input force. By contrast, traditional ball screw designs intended for linear actuation use a low screw pitch to create a greater linear force with low input torque. The large screw pitch also allows multiple thread starts to be oriented around the piston 150, outer cylinder 110, and inner shaft 190. More thread starts allow more ball bearings to carry the contact loads between the components. In the examples shown, there are fifteen thread starts, although it will be appreciated that an alternative number of thread starts could be used based on the desired application and size of the actuator.

Figure 3:
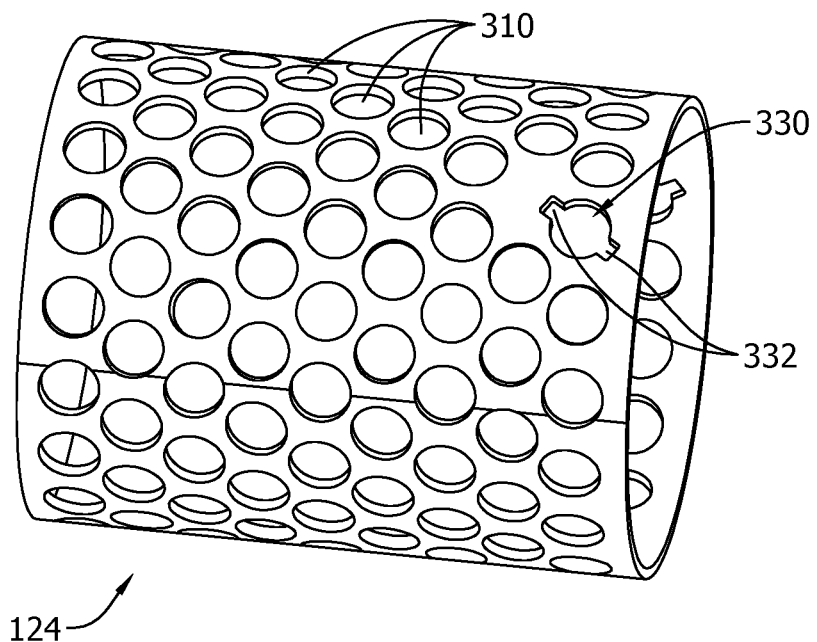
FIG. 3 is a perspective view of the outer ball cage in an illustrative embodiment.

FIG. 3 is a perspective view of the outer ball cage 124 in an illustrative embodiment. The outer ball cage 124 includes a hollow cylindrical body having a plurality of spacings 310 configured to position the outer ball bearings 122 in a spaced grid. Each spacing 310 may be sized slightly larger than an outer ball bearing 122 to provide enough clearance that allows the outer ball bearing 122 to roll while still controlling the position of the outer ball bearing 122. A row of spacings 310 corresponds with a helical groove 120.

Additionally, the outer ball cage 124 includes one or more gear spacings 330 configured to position an outer rotating gear 262. The gear spacing 330 may be sized may be sized slightly larger than an outer rotating gear 262 to provide enough clearance that allows the outer rotating gear 262 to float/rotate while minimizing the available play to control the position of the outer ball cage 124. The gear spacing 330 may include notches 332 providing sufficient clearance for teeth of the outer rotating gear 262. In embodiments with multiple gear spacings 330, the gear spacings 330 may be evenly spaced around a circumference of the outer ball cage 124.

Figure 4:
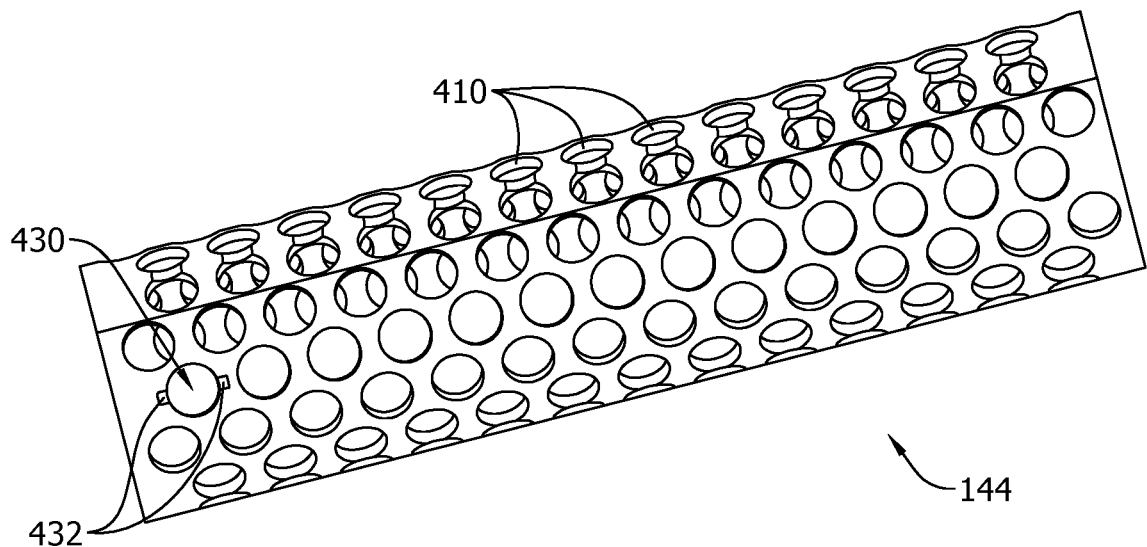
FIG. 4 is a perspective view of the inner ball cage in an illustrative embodiment.

FIG. 4 is a perspective view of the inner ball cage 144 in an illustrative embodiment. The inner ball cage 144 includes a hollow cylindrical body having a plurality of spacings 410 configured to position the inner ball bearings 142 in a spaced grid. Each spacing 410 may be sized slightly larger than an inner ball bearing 142 to provide enough clearance that allows the inner ball bearing 142 to roll while still controlling the position of the inner ball bearing 142. A row of spacings 410 corresponds with a straight groove 140.

Additionally, the inner ball cage 144 includes one or more gear spacings 430 configured to position an inner rotating gear 272. The gear spacing 430 may be sized may be sized slightly larger than an inner rotating gear 272 to provide enough clearance that allows the inner rotating gear 272 to float/rotate while minimizing the available play to control the position of the inner ball cage 144. The gear spacing 430 may include notches 432 providing sufficient clearance for teeth of the inner rotating gear 272. In embodiments with multiple gear spacings 430, the gear spacings 430 may be evenly spaced around a circumference of the inner ball cage 144.

Figure 5:
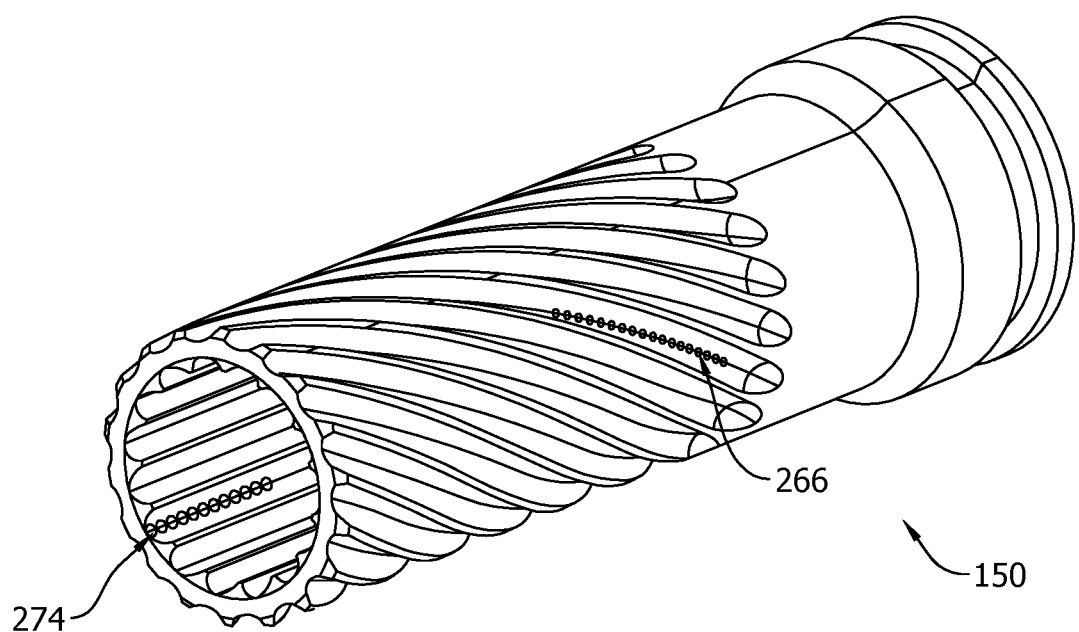
FIG. 5 is a perspective view of the piston in an illustrative embodiment.
Figure 6:
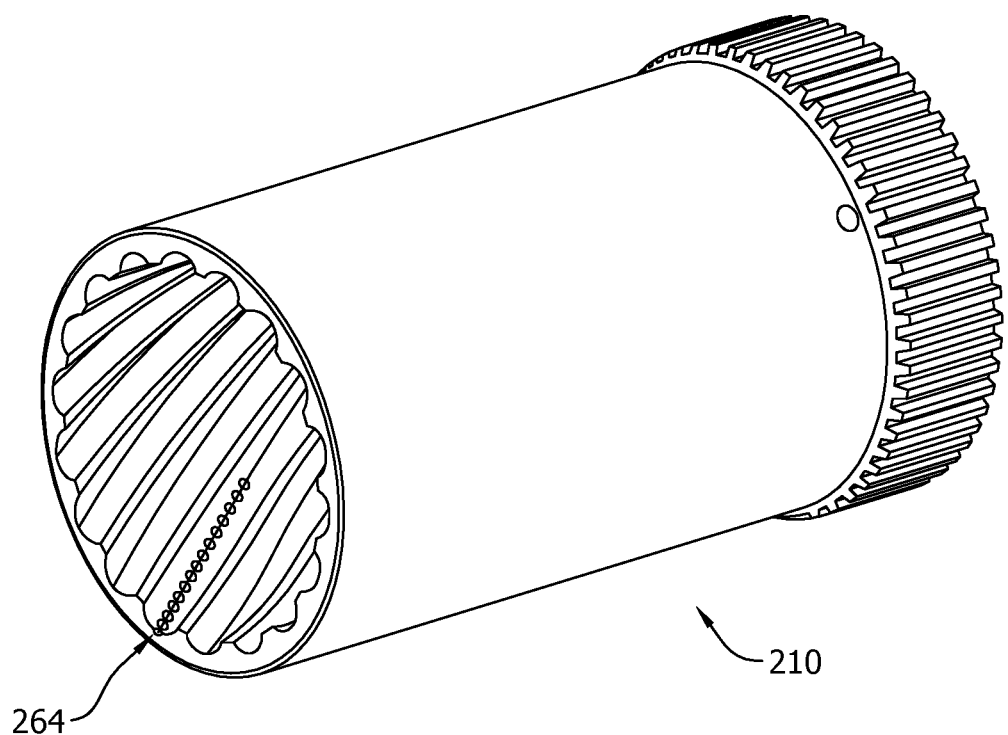
FIG. 6 is a perspective view of the helical sleeve in an illustrative embodiment.

FIG. 5 is a perspective view of the piston 150 in an illustrative embodiment. FIG. 5 more clearly shows the piston 150 includes a hollow cylindrical body having the second outer track gear 266 disposed on its outer diameter, and the first inner track gear 274 disposed on its inner diameter. FIG. 6 is a perspective view of the helical sleeve 210 in an illustrative embodiment. Similarly, FIG. 6 more clearly shows the helical sleeve 210 includes a hollow cylindrical body having the first outer track gear 264 is disposed on its inner wall surface. The second outer track gear 266 of the piston 150 and the first outer track gear 264 of the helical sleeve 210 align within a helical groove 120 to control the outer ball cage 124 therebetween. The outer track gears 264/266 may be configured with a length that facilitates assembly of the outer rotating gear 262, outer ball cage 124, and outer ball bearings 122.

Figure 7:
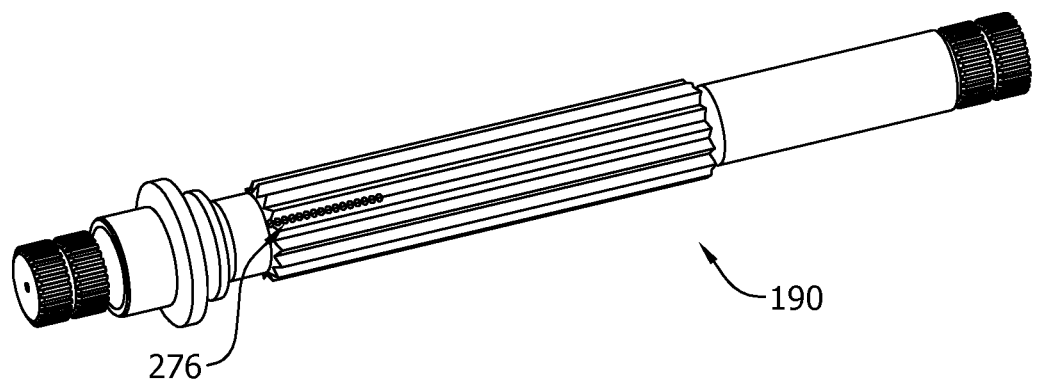
FIG. 7 is a perspective view of the inner shaft in an illustrative embodiment.

FIG. 7 is a perspective view of the inner shaft 190 in an illustrative embodiment. FIG. 7 more clearly shows the inner shaft 190 includes a cylindrical body having the second inner track gear 276 disposed on its outer diameter. The second inner track gear 276 of the inner shaft 190 and the first inner track gear 274 of the piston 150 align within a straight groove 140 to control the inner ball cage 144 therebetween. The inner track gears 274/276 may be configured with a length that facilitates assembly of the inner rotating gear 272, inner ball cage 144, and inner ball bearings 142.

Figure 8:
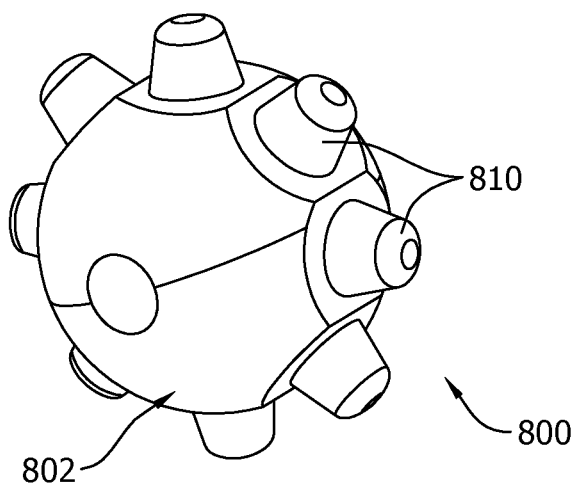
FIG. 8 is a perspective view of a rotating gear in an illustrative embodiment.

FIG. 8 is a perspective view of a rotating gear 800 in an illustrative embodiment. In one embodiment, the rotating gear 800 includes a spherical body 802 having a ring of gear teeth 810 disposed around its circumference. The gear teeth 810 may be sized and spaced to engage one or more outer track gears 264/266 and/or one or more inner track gears 274/276. The rotating gear 800 may be sized to float/rotate within a gear spacing 330/430 of respective ball cages 124/144. However, it will be appreciated that alternative configurations or terms of the indexing gear 160 is possible including cylindrical rotating gears, wheel rotating gears, rack and pinion gears, etc.

Figure 9:
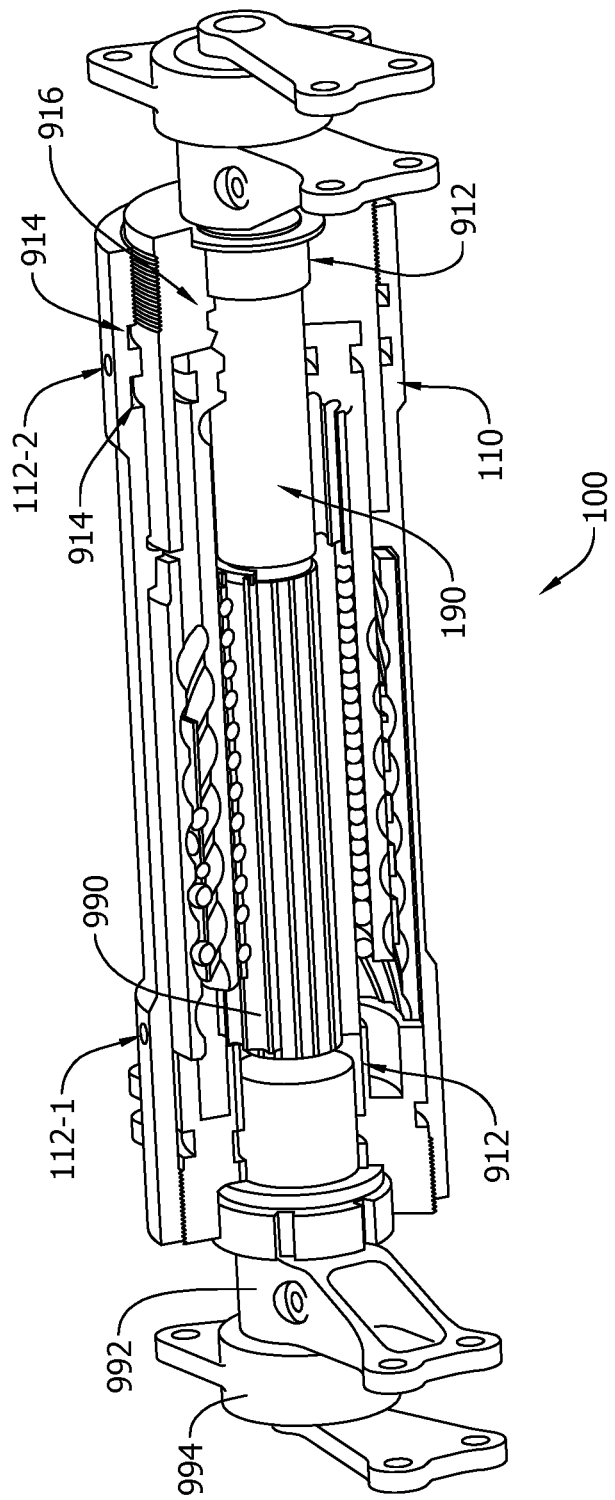
FIG. 9 is a cutaway perspective view of a ball screw rotary actuator in an illustrative embodiment.

FIG. 9 is a cutaway perspective view of a ball screw rotary actuator 100 in an illustrative embodiment. FIG. 9 more clearly illustrates various other components of the ball screw rotary actuator 100 not yet described. For example, the inner shaft 190 may include a shaft sleeve 990 slid over it that is coupled for co-rotation. Thus, an innermost diameter of the piston 150 may include a female portion of the straight grooves 140, and an outer diameter of the shaft sleeve 990 may include a male portion of the straight grooves 140.

Additionally, the inner shaft 190 may include splines (not shown) to transmit torque to a desired mechanical element such as spoiler fittings 992. The inner shaft 190 may also include journals 994 to mount with bearings of external structure. One or both distal ends of the inner shaft 190, including splines and/or journals 994, may protrude from the outer cylinder 110 depending on whether single or dual output is desired. The example of FIG. 9 shows a dual output configuration with a right fluid port 112-1 and left fluid port 112-2 for fluid input. Moreover, the inner shaft 190 may be supported within the outer cylinder 110 via bushings 912 at one or both ends of the outer cylinder 110. One or more seals 914 maintain pressure load within the ball screw rotary actuator 100. For example, a seal 914 disposed between the outer cylinder 110 and adjustable end gland 916 maintains pressures within the outer cylinder 110.

Figure 10:
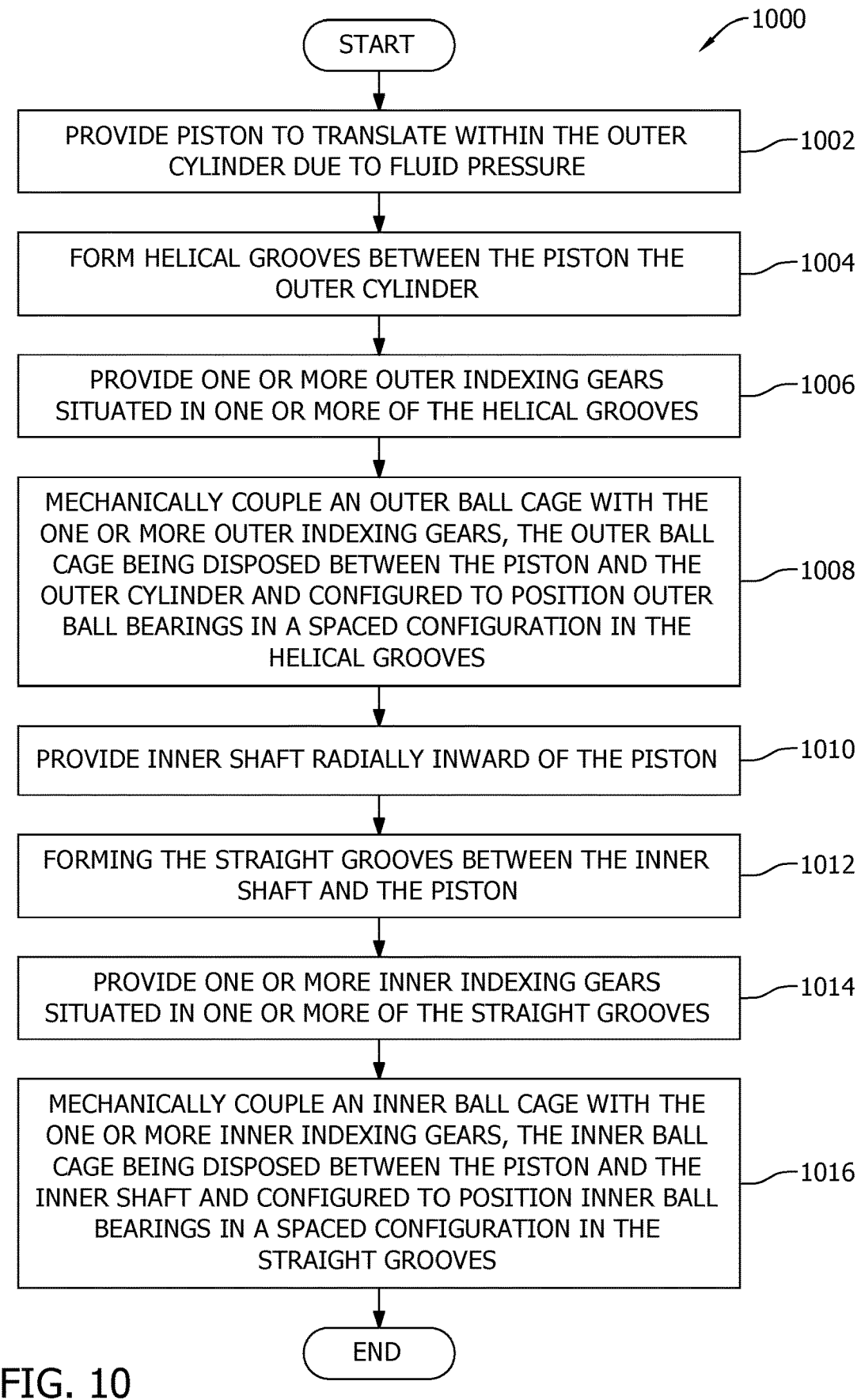
FIG. 10 is a flowchart of a method of assembling a ball screw rotary actuator in an illustrative embodiment.

FIG. 10 is a flowchart of a method 1000 of assembling a ball screw rotary actuator in an illustrative embodiment. The steps of the method 1000 will be described with reference to the ball screw rotary actuator 100 of FIGS. 1-2, but those skilled in the art will appreciate that the method 1000 may be performed in alternative rotary actuators. The steps of the flowchart(s) described herein are not all inclusive and may include other steps not shown. The steps described herein may also be performed in an alternative order.

In step 1002, the piston 150 is provided to translate within the outer cylinder 110 due to fluid pressure. In step 1004, helical grooves 120 are formed on the outer diameter of the piston 150. In step 1006, one or more outer indexing gears 160-1 are provided and situated in one or more of the helical grooves 120. In step 1008, an outer ball cage 124 is mechanically coupled with the one or more outer indexing gears 160-1, the outer ball cage 124 disposed between the piston 150 and the outer cylinder 110 and configured to position outer ball bearings 122 in a spaced configuration in the helical grooves 120.

In step 1010, the inner shaft 190 is provided radially inward of the piston 150. In step 1012, straight grooves 140 are formed between the inner shaft 190 and the piston 150. In step 1014, one or more inner indexing gears 160-2 are provided and situated in one or more of the straight grooves 140. And, in step 1016, an inner ball cage 144 is mechanically coupled with the one or more inner indexing gears 160-2, the inner ball cage 144 disposed between the piston 150 and the inner shaft 190 and configured to position inner ball bearings 142 in a spaced configuration in the straight grooves 140. Thus, the outer ball bearings 122 force rotation of the piston 150 with respect to the outer cylinder 110 as the piston translates due to the fluid pressure, and the inner ball bearings 142 force rotation of the inner shaft 190 as the piston 150 rotates. Additionally, the outer indexing gears 160-1 control a position of the outer ball cage 124 which controls a position of the outer ball bearings 122, and the inner indexing gears 160-2 control a position of the inner ball cage 144 which controls a position of the inner ball bearings 142. Advantageously, the method 1000 forms the ball screw rotary actuator 100 providing numerous technical advantages in terms of size, weight, efficiency, and back-drive capability.

Figure 11A:
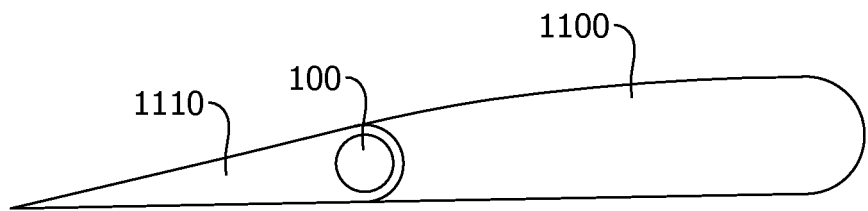
FIG. 11A is a side view of a wing including a control surface rotatable via the ball screw rotary actuator in an illustrative embodiment.
Figure 11B:
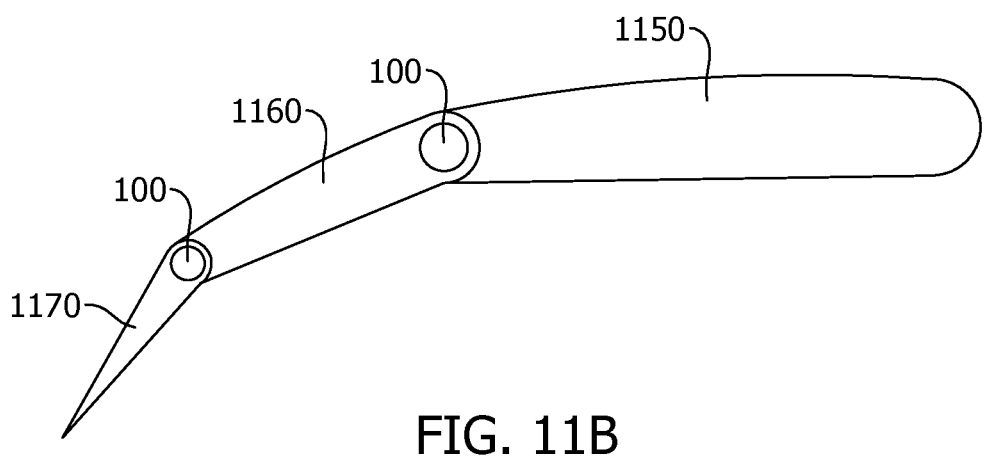
FIG. 11B is a side view of a multi-element wing including a first control surface and second control surface rotatable via ball screw rotary actuators in another illustrative embodiment.

FIG. 11A is a side view of a wing 1100 including a control surface 1110 rotatable via the ball screw rotary actuator 100 in an illustrative embodiment. The control surface 1110 may include, for example, a flap, aileron, or spoiler. FIG. 11B is a side view of a multi-element wing 1150 including a first control surface 1160 and second control surface 1170 rotatable via ball screw rotary actuators 100 in another illustrative embodiment. The small profile of the ball screw rotary actuators 100 may advantageously be incorporated into thin wing designs or implemented on multi-element flap systems to eliminate traditional canoe fairings.

Figure 12:
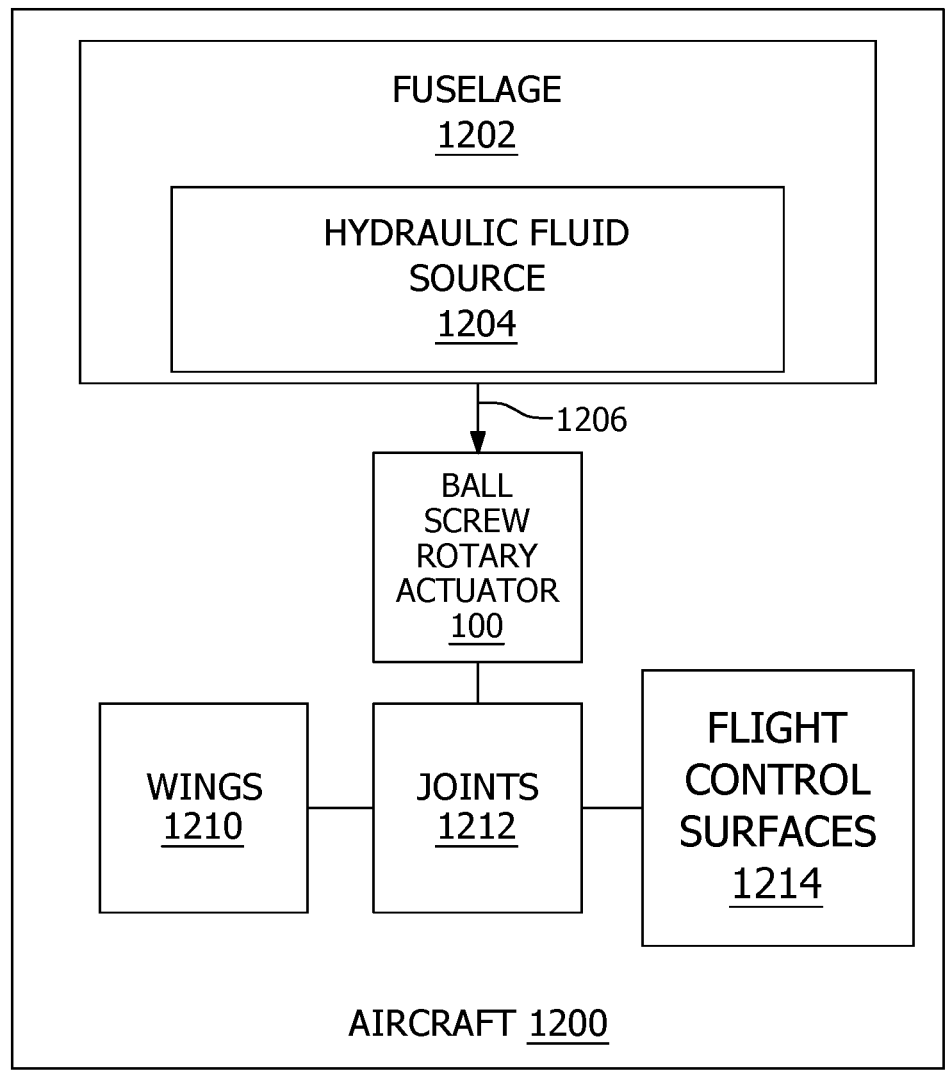
FIG. 12 is a block diagram of an aircraft including the ball screw rotary actuator in an illustrative embodiment.

FIG. 12 is a block diagram of an aircraft 1200 including the ball screw rotary actuator 100 in an illustrative embodiment. The aircraft 1200 includes a fuselage 1202 and one or more wings 1210 projecting from the fuselage 1202. The wings 1210 are connected to flight control surfaces 1214 via joints 1212. The ball screw rotary actuator 100 is connected to the joint and configured to rotate the flight control surface 1214 with respect to the wing 1210. A hydraulic fluid source 1204 of the aircraft 1200 supplies fluid 1206 to the ball screw rotary actuator 100 to move the flight control surfaces 1214.

Although specific embodiments were described herein, the scope is not limited to those specific embodiments. Rather, the scope is defined by the following claims and any equivalents thereof.

What is claimed is:

1. A ball screw rotary actuator, comprising:
   an outer cylinder including a fluid port;
   a piston configured to translate within the outer cylinder due to fluid pressure;
   helical grooves disposed between the outer cylinder and the piston;
   outer ball bearings configured to travel in the helical grooves to rotate the piston within the outer cylinder as the piston translates;
   an inner shaft situated radially inward of the piston;
   straight grooves disposed between the piston and the inner shaft;
   inner ball bearings configured to travel in the straight grooves, and to rotate the inner shaft as the piston rotates;
   an outer ball cage configured to position the outer ball bearings in a spaced configuration;
   an outer indexing gear configured to control a position of the outer ball cage;
   an inner ball cage configured to position the inner ball bearings in a spaced configuration; and
   an inner indexing gear configured to control a position of the inner ball cage.

2. The ball screw rotary actuator of claim 1, wherein:
   the outer indexing gear is situated within a gear spacing of the outer ball cage, and the outer indexing gear includes a rotating gear configured to engage one or more track gears to control the position of the outer ball cage.

3. The ball screw rotary actuator of claim 2, wherein:
   the rotating gear includes a spherical body having a ring of teeth to engage the one or more track gears as the rotating gear rotates.

4. The ball screw rotary actuator of claim 3, wherein:
   the one or more track gears include a series of indentations along a helical groove and configured to receive the teeth of the rotating gear.

5. The ball screw rotary actuator of claim 4, wherein:
   the one or more track gears include a first track gear disposed on an inner wall of the outer cylinder and a second track gear disposed on an outer diameter of the piston.

6. The ball screw rotary actuator of claim 1, wherein:
the inner indexing gear is situated within a gear spacing of the inner ball cage, and the inner indexing gear includes a rotating gear configured to engage one or more track gears to control the position of the inner ball cage.

7. The ball screw rotary actuator of claim 6, wherein:
the rotating gear includes a spherical body having a ring of teeth to engage the one or more track gears as the rotating gear rotates.

8. The ball screw rotary actuator of claim 7, wherein:
the one or more track gears include a series of indentations along a straight groove and configured to receive the teeth of the rotating gear.

9. The ball screw rotary actuator of claim 8, wherein:
the one or more track gears include a first track gear disposed on an inner diameter of the piston and a second track gear disposed on an outer diameter of the inner shaft.

10. A method of assembling a ball screw rotary actuator, the method comprising:
providing a piston to translate within an outer cylinder due to fluid pressure;
forming helical grooves between the piston and the outer cylinder;
providing one or more outer indexing gears situated in one or more of the helical grooves;
mechanically coupling an outer ball cage with the one or more outer indexing gears, the outer ball cage being disposed between the piston and the outer cylinder and configured to position outer ball bearings in a spaced configuration in the helical grooves;
providing an inner shaft radially inward of the piston;
forming straight grooves between the inner shaft and the piston;
providing one or more inner indexing gears situated in one or more of the straight grooves; and
mechanically coupling an inner ball cage with the one or more inner indexing gears, the inner ball cage being disposed between the piston and the inner shaft and configured to position inner ball bearings in a spaced configuration in the straight grooves.

11. The method of claim 10, wherein:
the outer ball bearings force rotation of the piston with respect to the outer cylinder as the piston translates due to the fluid pressure.

12. The method of claim 10, wherein:
the inner ball bearings force rotation of the inner shaft as the piston rotates.

13. The method of claim 10, wherein:
the one or more outer indexing gears control a position of the outer ball cage which controls a position of the outer ball bearings.

14. The method of claim 10, wherein:
the one or more inner indexing gears control a position of the inner ball cage which controls a position of the inner ball bearings.

15. An aircraft, comprising:
a fuselage;
a wing projecting from the fuselage;
a flight control surface connected to the wing via a joint; and
a ball screw rotary actuator connected to the joint and configured to rotate the flight control surface with respect to the wing, the ball screw rotary actuator comprising:
an outer cylinder including a fluid port;
a piston configured to translate within the outer cylinder due to fluid pressure;
helical grooves disposed between the outer cylinder and the piston;
outer ball bearings configured to travel in the helical grooves to rotate the piston within the outer cylinder as the piston translates;
an inner shaft situated radially inward of the piston;
straight grooves disposed between the piston and the inner shaft; and
inner ball bearings configured to travel in the straight grooves, and to rotate the inner shaft as the piston rotates;
an outer ball cage configured to position the outer ball bearings in a spaced configuration;
an outer indexing gear configured to control a position of the outer ball cage;
an inner ball cage configured to position the inner ball bearings in a spaced configuration; and
an inner indexing gear configured to control a position of the inner ball cage.

16. The aircraft of claim 15, wherein:
the helical grooves include a screw pitch to rotate the inner shaft one revolution for at least ten inches of translation of the piston.

17. The aircraft of claim 16, wherein:
the screw pitch of the helical grooves enable the ball screw rotary actuator to be back-driven.

18. The aircraft of claim 15, wherein:
the outer indexing gear is situated within a gear spacing of the outer ball cage, and the outer indexing gear includes a rotating gear configured to engage one or more track gears to control the position of the outer ball cage.

19. The aircraft of claim 15, wherein:
the inner indexing gear is situated within a gear spacing of the inner ball cage, and the inner indexing gear includes a rotating gear configured to engage one or more track gears to control the position of the inner ball cage.

20. The aircraft of claim 15, wherein:
the outer ball cage is configured to prevent the outer ball bearings from sliding, and
the inner ball cage is configured to prevent the inner ball bearings from sliding.

* * * * *